United States Patent

Cheng

[11] Patent Number: 5,440,948
[45] Date of Patent: Aug. 15, 1995

[54] LOCKING HINGE FOR A FOLDING BICYCLE

[75] Inventor: Kao P. Cheng, Changhua, Taiwan

[73] Assignee: Hsieh Chan Bicycle Co., Ltd., Changhua, Taiwan

[21] Appl. No.: 197,874

[22] Filed: Feb. 17, 1994

[51] Int. Cl.6 .................. B62K 21/12; B62K 21/16; B25G 3/18
[52] U.S. Cl. .................. 74/551.3; 74/551.1; 280/278; 280/279; 280/287; 403/322; 403/374
[58] Field of Search .................. 74/551.1–551.8; 280/278, 287, 279; 403/322, 374, 18, 20, 81

[56] References Cited

U.S. PATENT DOCUMENTS

| 4,433,852 | 2/1984 | Hon | 74/551.3 X |
| 4,911,458 | 3/1990 | Lin et al. | 280/287 X |
| 5,133,224 | 7/1992 | Prins | 74/551.3 |
| 5,269,550 | 12/1993 | Hon et al. | 280/278 |
| 5,301,972 | 4/1994 | Lee | 403/322 |
| 5,337,609 | 8/1994 | Hsu | 74/551.3 |
| 5,347,883 | 9/1994 | Thony | 403/322 X |
| 5,356,237 | 10/1994 | Sung | 403/374 |

FOREIGN PATENT DOCUMENTS

| 113141 | 2/1945 | Sweden | 74/551.3 |
| 122626 | 8/1948 | Sweden | 74/551.1 |

Primary Examiner—Vinh T. Luong
Attorney, Agent, or Firm—Browdy and Neimark

[57] ABSTRACT

An improved locking hinge for use in a folding bicycle is equipped with a lever arm which is in pivotal connection to a locking hook at the bottom end thereof. The locking hook also pivotally mounted onto the handlebar of a bicycle has a retaining recess which is made to engage with a locking pin mounted onto the steering stem of the bicycle so as to get a folding bicycle in use as long as the lever arm is pushed toward the erected handlebar which is put in linear alignment with the steering stem already. Besides, a securing spring plate is used to retain the lever arm in place so as to prevent the locking hook from disengagement from the locking pin as the bicycle is in use. To get the bicycle folded, the securing spring plate is lifted upwardly to permit the lever arm to pried outwardly, resulting in the locking hook disengaged with the locking pin. Then the handlebar and the steering stem are separated with each other and put side by side in a folding manner.

3 Claims, 4 Drawing Sheets

5,440,948

LOCKING HINGE FOR A FOLDING BICYCLE

BACKGROUND OF THE INVENTION

The present invention relates to an improved locking hinge mainly adapted for use in a folding bicycle. It permits a folding bicycle to be folded or extended with ease and speed and in a more secure manner.

The locking hinge is mainly operated by means of a pivotal lever arm which is pivotally engaged with a linkage member and a locking hook. One end of the linkage member is slidably confined in a tubular means and is in abutment against the bottom end of an adjustable bolt. The locking hook associated with the handlebar of a bicycle is selectably engaged with a locking pin mounted to the steering stem of a bicycle by operation of the lever arm so as to permit a bicycle to be folded or extended with ease. Besides, a securing spring plate is used to retain the lever arm in place so as to prevent the locking hinge from loosening in operation.

In a conventional folding bicycle, the locking hinge is either operated in an inconvenient or a slow manner, making the folding and unfolding operation of a bicycle time consuming and tedious.

SUMMARY OF THE INVENTION

The primary object of the present invention is to provide an improved locking hinge for use in a folding bicycle, facilitating a quick folding operation thereof.

Another object of the present invention is to provide an improved locking hinge which is provided with a secure device so as to make the locking hinge to be operated in a safer manner.

DETAILED DESCRIPTION OF THE PREFERRED EMBODIMENT

Figure 1:
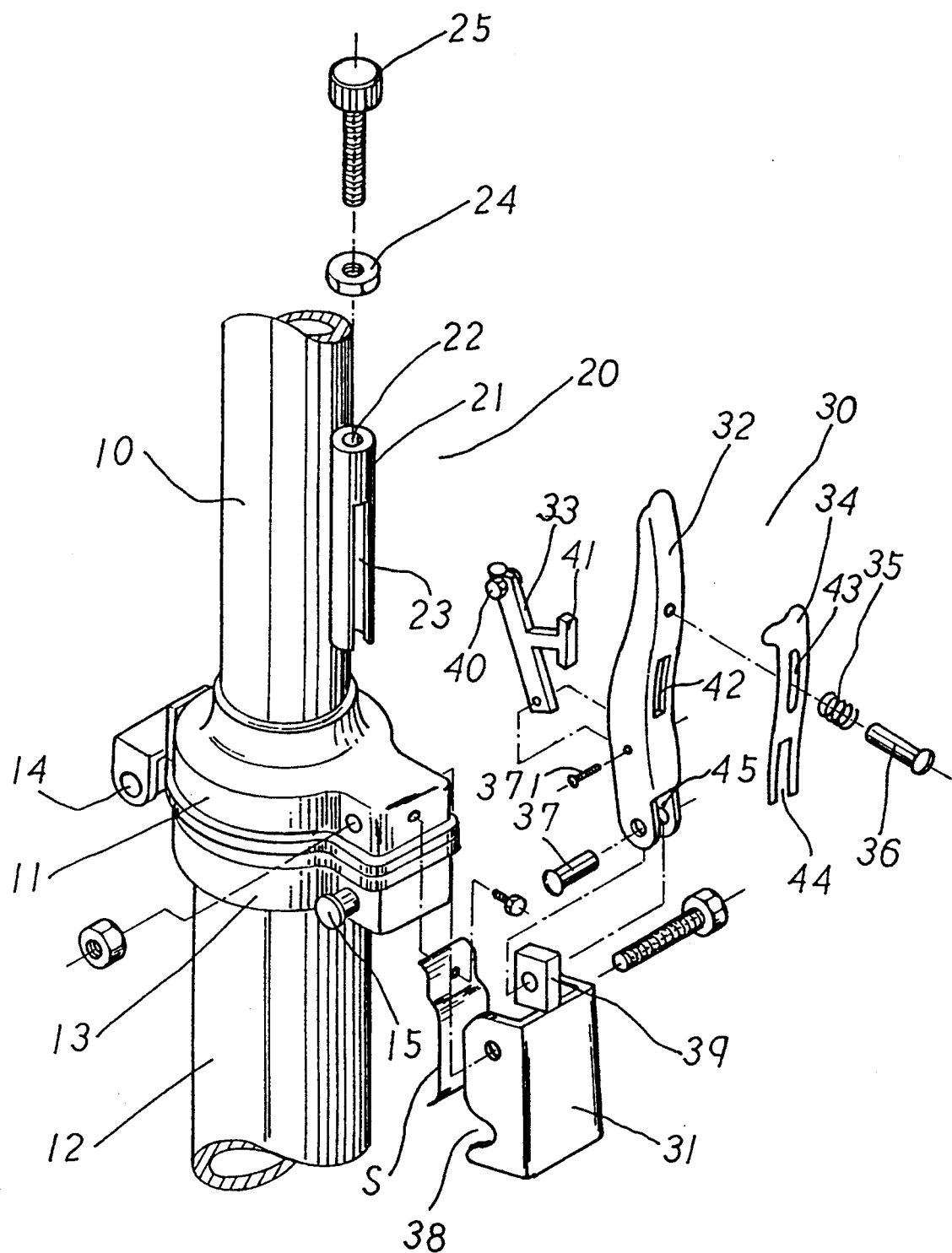
FIG. 1 is a perspective diagram showing the exploded components of the present invention.
Figure 2:
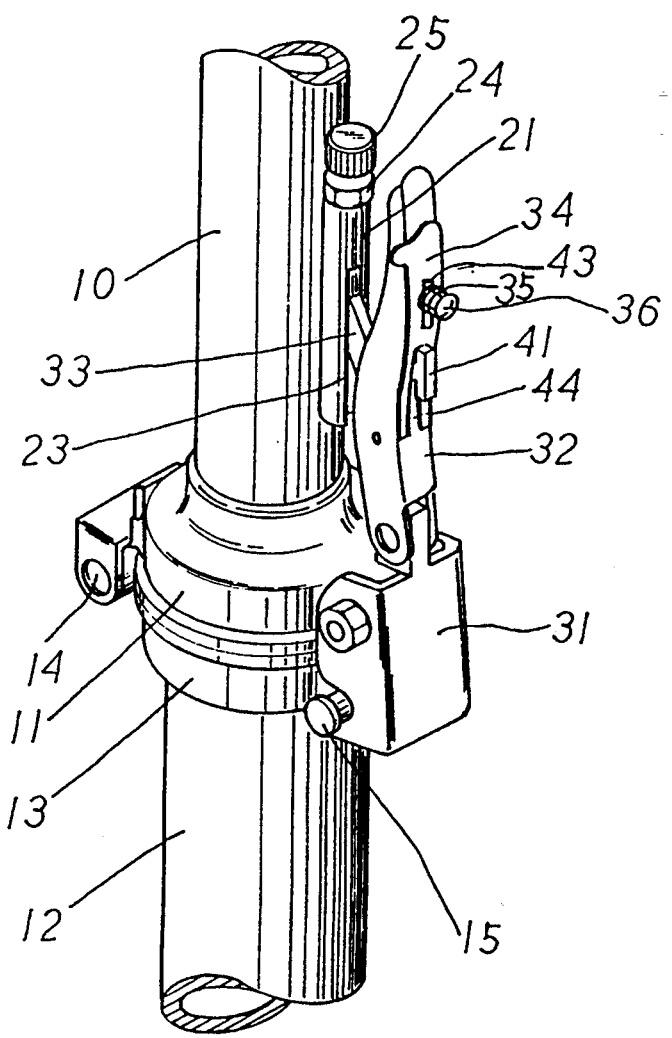
FIG. 2 is a perspective diagram showing the locking hinge in a locking state.

Referring to FIGS. 1, 2, the locking hinge of the present invention is comprised of an adjusting portion 20 and a locking portion 30. The adjusting portion 20 is mounted to a place near the lower end of a handlebar stem 10 and the locking portion 30 is pivotally engaged with a mount flange 11 disposed at the bottom end of the handlebar stem 10 and is also pivotally connected to the adjusting portion 20 by a linkage member 33.

The locking portion 30 mainly includes a lever arm 32, the linkage member 33, a securing spring plate 34, a locking hook 31, and a spring plate S. One end of the linkage member 33 having a pair of limiting projections 40 is disposed in an opened cut 23 of a securing tube 21 having a central hole 22 in which an adjustable bolt 25 is movably located with a nut 24 associated therewith. The opposite end of the linkage member 33 is pivotally engaged with the lever arm 32 by a screw 371. A T-shaped horizontal extension 41 of the linkage member 33 is selectively engaged with a slot 42 disposed on the center of the lever arm 32.

Pivotally linked to the bottom end of the lever arm 32 is the locking hook 31 which is provided with a pivot hinge 39 at one end thereof. The pivot hinge 39 is disposed in a space formed between two symmetric lugs 45 and be pivotally fixed by a rivet 37. A retaining recess 38 is formed on one side of the locking hook 31 respectively. The locking hook 31 is pivotally secured to the mount flange 11 of the handlebar 10.

The securing spring plate 34 is slidably attached to the lever arm 32 by a pin 36 having a spring 35 mounted thereto and riveted in place onto the lever arm 32. A slot 43 is disposed on the securing spring plate 34 for the passage of the pin 36. The bottom end of the securing spring plate 34 is provided with an opening cut 44 which is selectively engaged with the T-shaped extension 41 of the linkage member 33.

Figure 3:
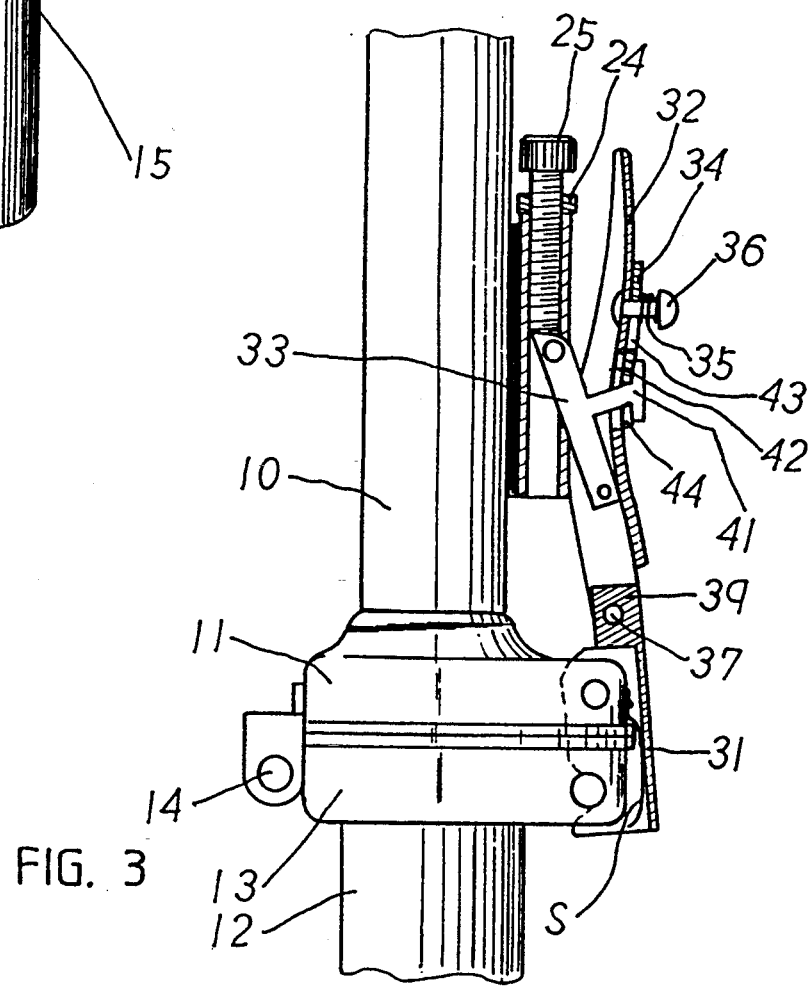
FIG. 3 is a partially sectional view showing the detailed structure of the locking hinge.

As shown in FIGS. 2, 3, the locking hook 31 is pivotally fixed to the mount flange 11. The handlebar 10 and the steering stem 12 is pivotally linked by a pivot means 14 and further locked together by the locking hinge of the present invention when the bicycle is put in use.

The top end of the steering stem 12 is provided with a flange portion 13 on which is disposed a locking pin 15. In hooking engagement with the locking pins 15 are the retaining recesses 38 of the locking hook 31. The second spring plate S is secured to the mount flange 11 of the handlebar 10 and is in contact with the locking hook 31 as shown in FIGS. 3, 4A, 4B, 5A, 5B.

Figure 4A:
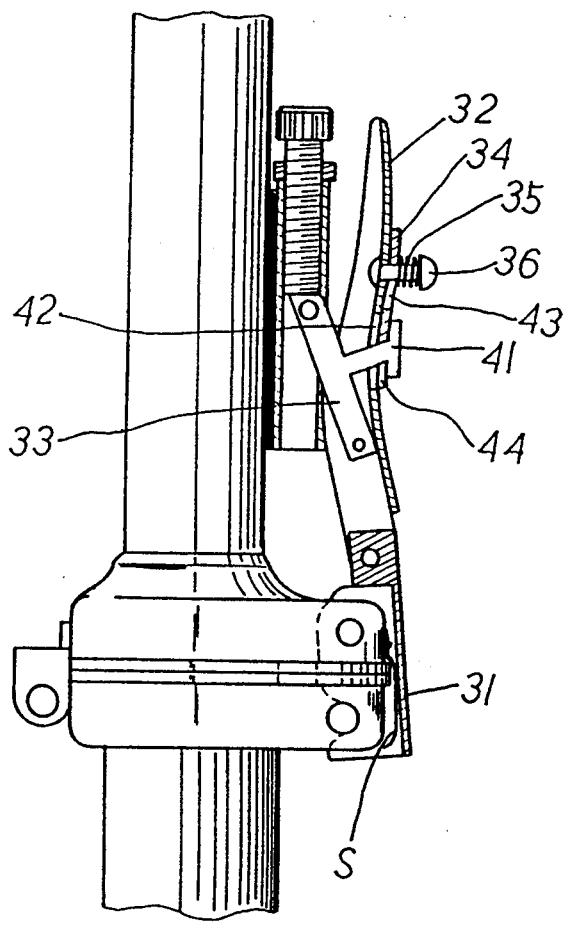
FIGS. 4A, 4B are diagrams showing the upward movement of the securing spring plate of the locking hinge.
Figure 4B:
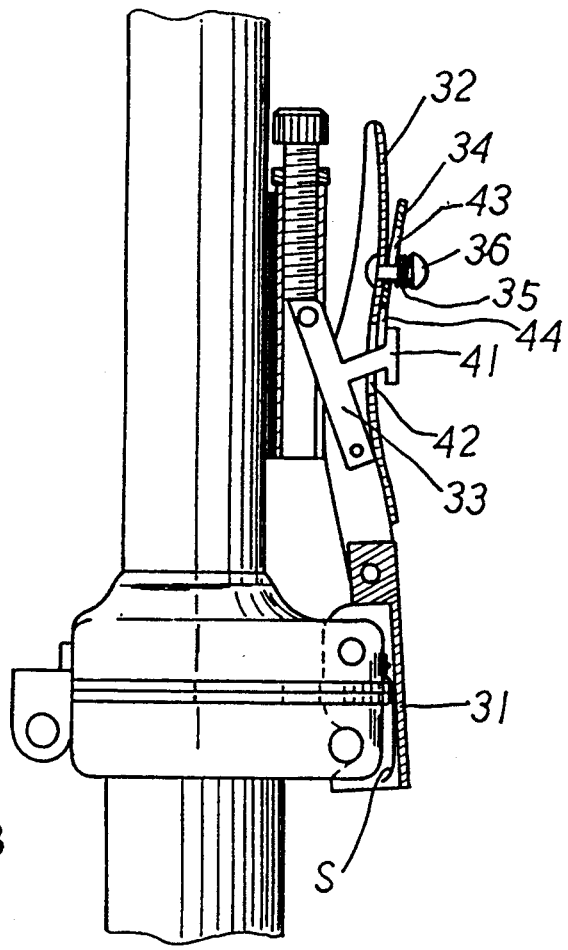

Referring to FIGS. 4A, 4B, in an operation to extend a bicycle into use, the handlebar 10 is erected upwardly first and put into linear alignment with the steering stem 12, and then the lever arm 32 is pushed toward the handlebar 10, causing the linkage member 33 having one end with the limiting projections 40 in urging abutment against the bottom end of the adjustable bolt 25. As shown in FIG. 3, the inward push of the lever arm 32 makes the pivot end of the linkage member 33 exert force on the inner side of the lever arm 32, resulting in the pivot end at which the locking hook 31 and the bottom end of the lever arm 32 are connected to each other being forced in a counter direction with respect to the force exerted on the lever arm 32 so that the retaining recess 38 is forced in locking engagement with the locking pin 15.

In the meanwhile, the T-shaped extension 41 of the linkage member 33 will go through the slot 42 of the lever arm 32. To retain the linkage member 33 in place so as to firmly keep the locking hook 31 in tight engagement with the locking pin 15, the securing spring plate 34 is pushed with a force larger than the force applied by the spring 35 thereon, making the opening cut 44 in retaining engagement with the T-shaped horizontal extension 41 of the linkage member 33. Thus, the lever arm 32 can not be pried outwardly if the securing spring plate 34 is not lifted up to get the T-shaped extension 41 free.

To adjust the degree of tightness of the locking hook 31 with respect to the locking pin 15, the adjustable bolt 25 can be moved upwardly or downwardly by turning, making the top end of the linkage member 33, having the limiting projections 40, in tight or loose contact with the bottom end of the adjustable bolt 25.

Figure 5A:
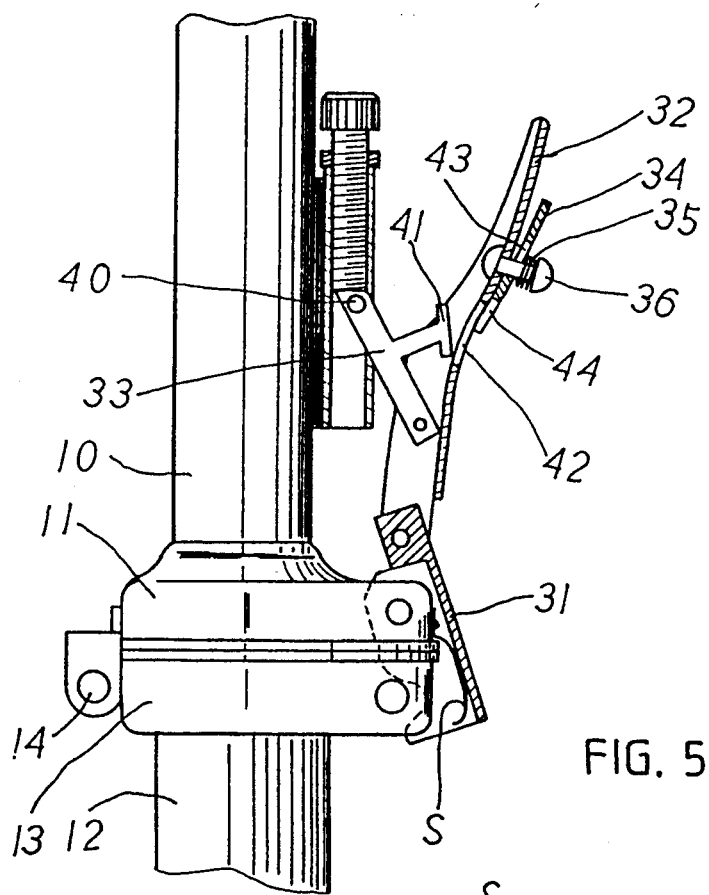
FIG. 5A is a diagram showing the lever arm being pried up to get the locking hinge disengaged.
Figure 5B:
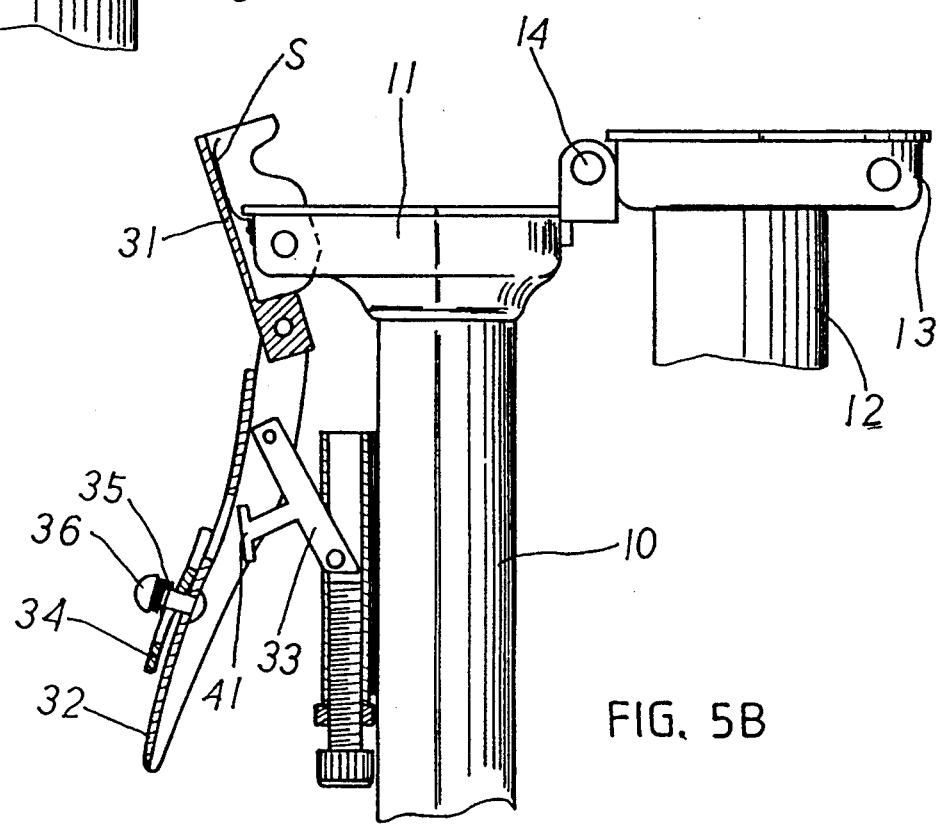
FIG. 5B is a diagram showing the locking hinge being opened and the steering stem and the handlebar being pivotally disengaged.

To get the extended bicycle folded, the handlebar 10 must be pivoted downwardly and leans side by side with the steering stem 12, the securing spring plate 34 is lifted upwardly by hand to free the T-shaped extension 41 from the engagement with the securing spring plate 34. Then the lever arm 32 is pried outwardly, away from the handlebar 10, as shown in FIGS. 4A, 4B, to make the retaining recess 38 disengage with the locking pin 15, as shown in FIGS. 5A, 5B.

I claim:

1. An improved locking hinge for a folding bicycle, comprising:

a lever arm;

a locking hook pivotally secured to a flanged bottom end of a handlebar of said folding bicycle;

a linkage member pivotally connected to said lever arm;

said locking hook having a pivot hinge associated therewith being pivotally connected to said lever arm and a mount flange at the bottom end of said handlebar respectively;

a locking pin disposed on a flanged portion of a steering stem of said folding bicycle;

a tubular means secured to said handlebar having an opening cut so as to permit said linkage member to slidably move therein and said linkage member can be restrained in place by abutment against a point in said tubular means for locking purpose;

said locking hook having a retaining recess being selectively engaged with said locking pin so as to keep said handlebar and said steering stem engaged with or disengaged from each other.

2. An improved locking hinge as claimed in claim 1 wherein said linkage member has a horizontally disposed T-shaped extension which can go in and out of a slot disposed on said lever arm and is selectively engaged with another opening cut at one end of a securing spring plate which is movably secured to said lever arm and can be downwardly or upwardly actuated so as to retain said linkage member in place or allow the same to be pivoted by actuation of said lever arm.

3. An improved locking hinge as claimed in claim 1 wherein said tubular means secured to said handlebar is engaged with a bolt means which can be screwed downwardly or upwardly in said tubular means so as to vary the position of contact of said linkage member in said tubular means.

* * * * *